United States Patent
Kitano et al.

(10) Patent No.: US 8,061,463 B2
(45) Date of Patent: Nov. 22, 2011

(54) CONTROL SYSTEM FOR HYBRID VEHICLE

(75) Inventors: Kazuhiko Kitano, Wako (JP);
Masachika Kimura, Wako (JP);
Yasuhiro Ijichi, Wako (JP); Yutaka Ishikawa, Wako (JP); Takashi Horiguchi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 1235 days.

(21) Appl. No.: 11/281,698

(22) Filed: Nov. 18, 2005

(65) Prior Publication Data
US 2006/0108163 A1    May 25, 2006

(30) Foreign Application Priority Data

Nov. 25, 2004  (JP) .................................. 2004-340533
Nov. 25, 2004  (JP) .................................. 2004-340534

(51) Int. Cl.
*B60W 10/04* (2006.01)
(52) U.S. Cl. ................................................. 180/65.285
(58) Field of Classification Search ............. 180/65.285; 477/3, 78, 107; 475/2
See application file for complete search history.

(56) References Cited

U.S. PATENT DOCUMENTS

| | | | | |
|---|---|---|---|---|
| 5,857,443 A * | 1/1999 | Kono et al. | ................ | 123/339.2 |
| 6,233,508 B1 * | 5/2001 | Deguchi et al. | ................ | 701/22 |
| 6,244,368 B1 * | 6/2001 | Ando et al. | ................ | 180/65.25 |
| 6,301,529 B1 * | 10/2001 | Itoyama et al. | ................ | 701/22 |
| 6,459,980 B1 * | 10/2002 | Tabata et al. | ................ | 701/70 |
| 6,543,565 B1 * | 4/2003 | Phillips et al. | ................ | 180/165 |
| 6,569,055 B2 * | 5/2003 | Urasawa et al. | ................ | 477/5 |
| 6,835,160 B2 * | 12/2004 | Kitano et al. | ................ | 477/5 |
| 7,115,064 B2 * | 10/2006 | Masterson et al. | ................ | 477/3 |
| 2003/0203790 A1 * | 10/2003 | Matsubara et al. | ................ | 477/107 |
| 2005/0181907 A1 * | 8/2005 | Colvin et al. | ................ | 477/3 |
| 2007/0111848 A1 * | 5/2007 | Tabata et al. | ................ | 477/3 |

FOREIGN PATENT DOCUMENTS

| | | |
|---|---|---|
| JP | 6-319210 | 11/1994 |
| JP | 9-322307 | 12/1997 |
| JP | 10-73161 | 3/1998 |
| JP | 2000-170903 A | 6/2000 |
| JP | 2003-205767 | 7/2003 |
| JP | 2004-84679 | 3/2004 |
| JP | 2004-210123 | 7/2004 |

OTHER PUBLICATIONS

Chinese Office Action dated Jun. 26, 2009, issued in corresponding Chinese Patent Application No. 200510127204.2.

* cited by examiner

*Primary Examiner* — Jeffrey J Restifo
*Assistant Examiner* — Travis Coolman
(74) *Attorney, Agent, or Firm* — Westerman, Hattori, Daniels & Adrian, LLP

(57) ABSTRACT

A hybrid vehicle comprises an engine 2, a motor generator 4, a torque converter 6 with a lock-up clutch 5, and a ratio-change mechanism 7. A control system for the hybrid vehicle comprises a rotational sensor 22, which detects the slip ratio of the torque converter, and a hydraulic control valve 12, which controls the engagement of the lock-up clutch. While the vehicle is moving along with the accelerator pedal being released from its stepped down condition, a driving force from the wheels is transmitted to the motor generator 4 for energy regeneration. If the slip ratio of the torque converter is equal to or smaller than a first threshold value, then only the lock-up clutch is controlled into engagement. However, if the slip ratio is between the first threshold value and a second threshold value, then additionally the motor generator is controlled in cooperative operation.

7 Claims, 11 Drawing Sheets

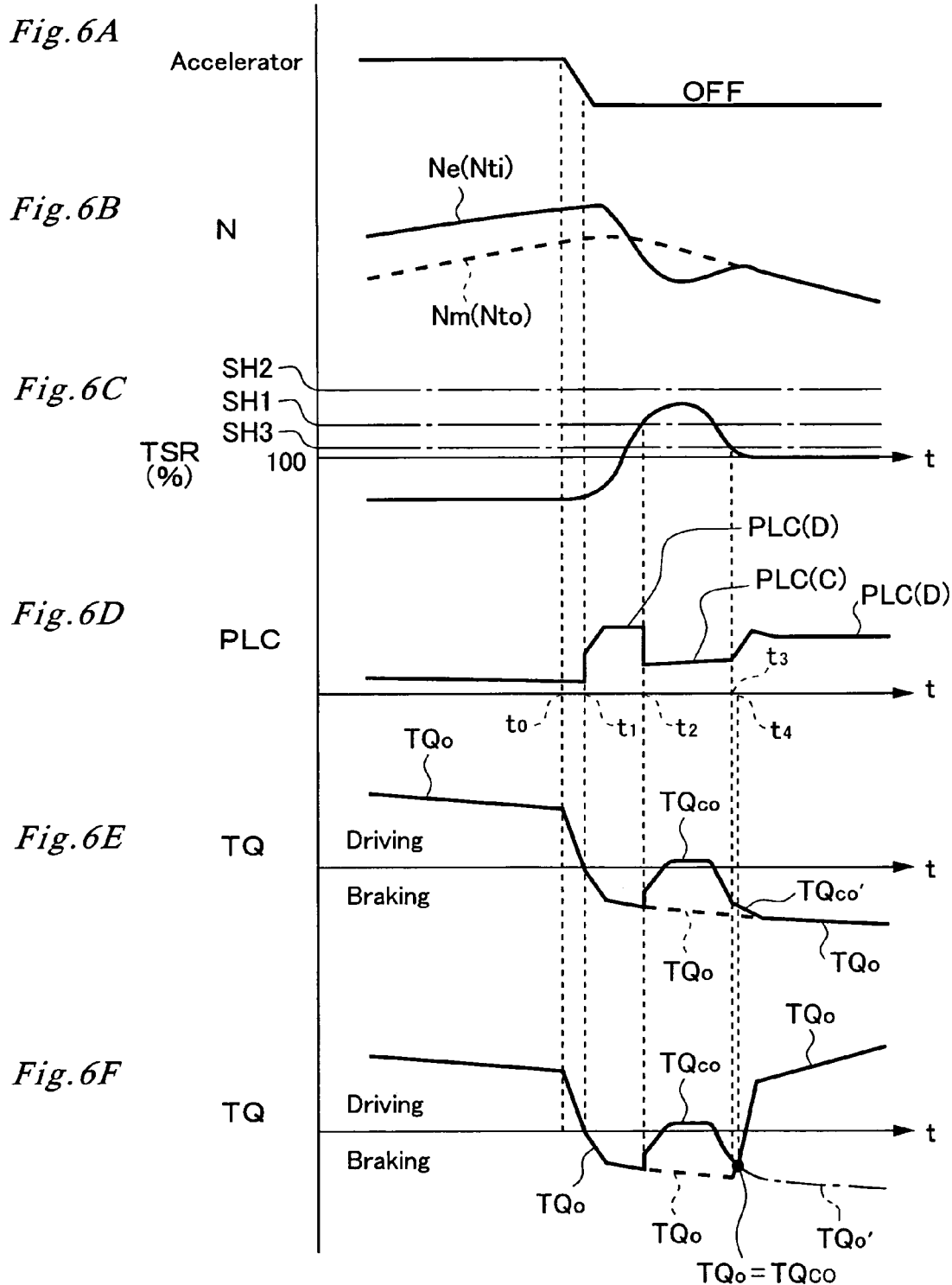

*Fig.11A* Accelerator
*Fig.11B* F. CUT
*Fig.11C* Ne
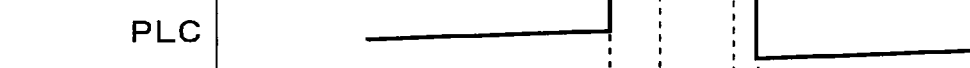
*Fig.11D* PLC
*Fig.11E* Pc
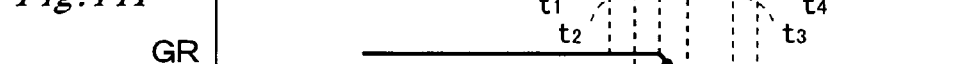
*Fig.11F* GR
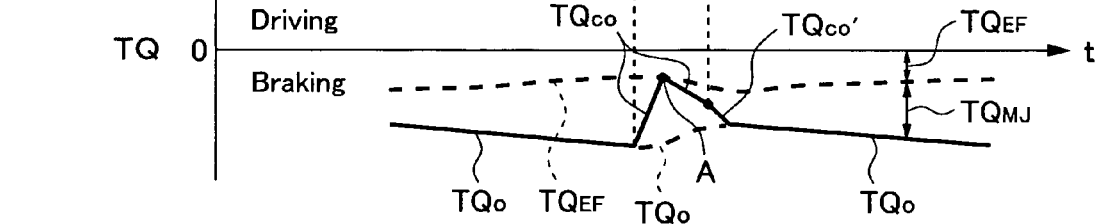
*Fig.11G* TQ

CONTROL SYSTEM FOR HYBRID VEHICLE

FIELD OF THE INVENTION

The present invention relates to a hybrid vehicle that comprises an engine, a motor generator, a torque converter with a lock-up clutch, and a ratio-change mechanism and that is driven by the driving force of at least one of the engine and the motor generator, the driving force being transmitted to drive wheels through the torque converter and the ratio-change mechanism.

BACKGROUND OF THE INVENTION

Such hybrid vehicles are disclosed in, for example, Japanese Laid-Open Patent Publication Nos. H6(1994)-319210, H9(1997)-322307, H10(1998)-73161, 2003-205767, 2004-84679 and 2004-210123. As described in these disclosures, various types of hybrid vehicle have been proposed. For example, the following ideas are incorporated in a system where the vehicle is driven by the driving force being transmitted to drive wheels from both the engine and the motor generator or selectively from one or the other, i.e., a system where the engine and the motor generator are arranged in series. When the vehicle is started from standstill or accelerated, the driving force is supplied from both the engine and the motor generator for ensuring an accelerating power. On the other hand, when the vehicle is decelerated (with the accelerator being released), the operation of the engine is controlled to terminate (in idling-elimination control), or the suction and exhaust valves of some or all of the cylinders are controlled to close in partial or all cylinder-off control for improving fuel efficiency and for reducing emission. In addition, the force from the side of the drive wheels is transmitted to the motor generator for energy regeneration and for braking action, which assists the engine brake.

Generally, the driving force from the engine and the motor generator is transmitted not directly to the drive wheels but through a transmission that varies the gear ratio or speed change ratio, and an automatic transmission that comprises a torque converter and a ratio-change mechanism is often used as such a transmission. In a hybrid vehicle equipped with such an automatic transmission, while the vehicle is being decelerated (with the accelerator being released) with the force from the drive wheels being transmitted to the motor generator, slips are likely to occur in the torque converter, resulting in a low transmission efficiency. This condition leads to problems of low efficiency in energy regeneration, low effectiveness in engine brake assistance and the like.

In the case where the engine is stopped for energy regeneration while the vehicle is being decelerated, the lock-up clutch of the torque converter is engaged in the automatic transmission not to allow slippage in the torque converter, for improving the energy regeneration efficiency.

Furthermore, for example, the above mentioned Japanese Laid-Open Patent Publication No. 2004-210123 discloses a hybrid vehicle, which solves the above mentioned problems. In this hybrid vehicle, when the vehicle is being decelerated (with the accelerator being released), the operation of the motor generator is controlled to reduce the slippage of the torque converter (in cooperative control of the motor generator) for bring the lock-up clutch quickly into engagement. Additionally, the control system disclosed in the above mentioned Japanese Laid-Open Patent Publication No. 2004-210123 starts the operation of the engine with its cylinders turned off. In this case, the quick engagement of the lock-up clutch enables a prompt transition to the operation of the engine with its cylinders off, effecting an improvement in fuel efficiency.

On the other hand, while the vehicle is being decelerated, generally the speed of the vehicle decreases, and in response to this slowdown, the automatic transmission is controlled to downshift. However, if a shifting is executed while the lock-up clutch is engaged for improving the energy regeneration efficiency, then there can be a sudden change in the braking force (so-called engine brake force), which may give a sense of incongruity to the driver. For this problem, Patent Reference 3 discloses a system that allows no shifting while energy regeneration is performed during deceleration of the vehicle.

By the way, if the operation of the motor generator is controlled cooperatively, then the lock-up clutch can be engaged promptly. However, at the time of the start of the deceleration, when the accelerator pedal is released from its held down position, the slip ratio of the lock-up clutch is often relatively small. Therefore, in many cases, the lock-up clutch can be engaged quickly and smoothly without cooperative operation of the motor generator. In such cases, if the motor generator is operated in cooperation, then the driving torque of the motor generator in cooperation can be transmitted to the drive wheels, causing a fluctuation in the driving torque (accelerating torque). This fluctuation is a problem that may give the driver a sense of incongruity in the operation of the vehicle.

Moreover, there is a case where it is difficult to reduce the slip ratio of the torque converter by the cooperative operation control of the motor generator. There is also a case where the slip ratio of the torque converter does not decrease even though the cooperative operation control is executed, or even a case where the slip ratio of the torque converter increases contrary to what is expected from the execution of the cooperative operation control. In such cases, the continuation of the cooperative operation of the motor generator results only in a waste of electrical power, which leads to a problem of depletion of the battery charge.

Further, in a case where no shifting is allowed while the vehicle is in deceleration and where, for example, the deceleration of the vehicle is effected by the termination of the engine operation caused by a fuel cutoff while the transmission is set at a high speed ratio, the rotational speed of the engine can become lower than an idling rotational speed. In such a case, it is necessary to cancel the fuel cutoff and to restart the operation of the engine for accelerating the vehicle again. This situation results in a problem that lowers the fuel efficiency. In addition, it is necessary for the vehicle to downshift for the re-acceleration because the vehicle coasting at a relatively low speed with its transmission set at a high speed ratio cannot gain a drive power necessary for acceleration. This presents a problem of reduced drivability.

While it is desirable to shift the speed ratio in response to changes in the operating condition of the vehicle, it is necessary to prevent shift shock that may occur from the shifting and give a sense of incongruity. Therefore, it is proposed that the motor generator be driven during the shifting to bring the rotational speed on the side of the engine (i.e., the rotational speed of the input shaft of the transmission) closer to that expected for the speed change ratio after the shifting (refer to, for example, Japanese Laid-Open Patent Publication No. H6(1994)-319210). This control is hereinafter referred to as cooperative operation control of the motor generator for the shifting.

However, if the torque of the motor generator is controlled during the shifting mainly for bringing the rotational speed on the side of the engine to a rotational speed expected for the ratio after the shifting, for example, if the motor generator is controlled to increase the rotational speed of the engine during a downshifting, then it can generate a torque that accelerates the vehicle, resulting in a feel of acceleration even during a downshifting. This can be a problem that gives also a sense of incongruity.

SUMMARY OF THE INVENTION

It is an object of the present invention to provide a control system for a hybrid vehicle, which system can restrain the electric power consumption for the motor generator by limiting its cooperative operation to a required minimum, and which system controls the engagement of the lock-up clutch appropriately in correspondence to the driving condition of the vehicle.

It is an object of the present invention to provide a control system for a hybrid vehicle, which system executes the shifting (downshifting) during the deceleration of the vehicle with the cooperative operation of the motor generator without generating a feel of acceleration during the shifting, which can be otherwise taken by the driver as a sense of incongruity.

According to a first aspect of the present invention, a control system is provided for a hybrid vehicle that comprises an engine, a motor generator, a torque converter with a lock-up clutch, and a ratio-change mechanism. This vehicle is driven by the driving force being transmitted from at least one of the engine and the motor generator through the torque converter and the ratio-change mechanism to wheels. The control system comprises slip-detecting means (for example, the rotation sensor 22 described in the following embodiment), which detects the slip ratio of the torque converter, and lock-up-controlling means (for example, the hydraulic control valve 12 and the control unit 15 described in the following embodiment), which controls the engagement of the lock-up clutch. While the hybrid vehicle is moving along with the accelerator pedal being released from its stepped down condition, the driving force from the wheels is transmitted through the ratio-change mechanism and the torque converter to the motor generator for energy regeneration. If the slip ratio of the torque converter, which is detected by the slip-detecting means, is equal to or smaller than a first threshold value, which indicates that the slip ratio is in a range where the lock-up clutch can be brought into engagement smoothly, then the lock-up clutch is controlled into engagement only by the lock-up-controlling means.

With this control system, while the vehicle is moving along with the accelerator pedal being released from its stepped down condition, the control system transmits the driving force from the wheels through the ratio-change mechanism and the torque converter to the motor generator for energy regeneration. Furthermore, if the slip ratio of the torque converter, which is detected by the slip-detecting means, is larger than the first threshold value and equal to or smaller than a second threshold value, which is greater than the first threshold value by a predetermined value, then the control system preferably brings the lock-up clutch into engagement by the lock-up-controlling means while it is operating the motor generator cooperatively to reduce the slip ratio.

Moreover, after the cooperative operation control of the motor generator and the engaging control of the lock-up clutch are initiated, if the slip ratio of the torque converter becomes equal to or smaller than a third threshold value, which is smaller than the first threshold value, then the control system preferably terminates the cooperative operation of the motor generator and brings the lock-up clutch into engagement.

Also, after the cooperative operation control of the motor generator and the engaging control of the lock-up clutch are initiated, if the slip ratio of the torque converter, which is detected by the slip-detecting means, becomes larger than the second threshold value, then the control system preferably terminates both the cooperative operation of the motor generator and the engaging of the lock-up clutch by the lock-up-controlling means.

Furthermore, with the above described control system, after the cooperative operation control of the motor generator and the engaging control of the lock-up clutch are initiated, if the slip ratio of the torque converter, which is detected by the slip-detecting means, continues to remain in the range between the third threshold value and the second threshold value beyond a predetermined time period, then the control system preferably terminates only the cooperative operation of the motor generator.

In addition, while the vehicle is moving along with the accelerator pedal being released from its stepped down condition, if the cooperative operation of the motor generator is to be terminated, then the control system preferably brings the driving torque of the motor generator gradually to a target torque value.

Furthermore, while the vehicle is moving along with the accelerator pedal being released from its stepped down condition, and the motor generator is being operated in cooperation, if the accelerator pedal is stepped down, then the control system preferably terminates the cooperative operation of the motor generator and the engaging of the lock-up clutch and brings the driving torque of the motor generator and the engine to a target torque value.

According to the first aspect of the present invention, if the slip ratio of the torque converter is equal to or smaller than the first threshold value, the control system brings the lock-up clutch into engagement by the lock-up-controlling means. In this case, the first threshold value is a value that represents a little slip and has a slip ratio of, for example, 110% as mentioned in the preferred embodiment. In this condition, the control system can bring the lock-up clutch into engagement quickly and smoothly only by the operation of the lock-up-controlling means without cooperative operation of the motor generator. As a result, this control system effectively prevents fluctuations in the driving torque, which can be otherwise caused from the transmission of the torque applied by the motor generator to the wheels if the motor generator is operated in cooperation even when the slip ratio is small. Therefore, the driver never feels such a sense of incongruity as mentioned in the previous section.

However, if the slip ratio of the torque converter is larger than the first threshold value and equal to or smaller than the second threshold value, then the control system operates the motor generator in cooperation to reduce the slip ratio and then brings the lock-up clutch into engagement by the lock-up-controlling means. It is understood from this case that the control system operates the motor generator in cooperation appropriately and only when it is necessary. In this case, for example, the first threshold value is set at 110%, and the second threshold value is set at 120%. In a case where the slip occurring in the torque converter is in this magnitude, fluctuations in the torque of the motor generator in cooperative operation are absorbed in the torque converter and hardly transmitted to the wheels. As a result, the driver never feels a sense of incongruity.

After the start of the cooperative operation control of the motor generator and the engaging control of the lock-up clutch, if the slip ratio becomes equal to or smaller than the third threshold value (for example, 101%), the control system preferably terminates the cooperative operation of the motor generator and brings the lock-up clutch into engagement. After the execution of the cooperative operation control, the lock-up clutch is brought into engagement quickly.

On the other hand, if the slip ratio is larger than the second threshold value, then it is considered difficult to bring the lock-up clutch into engagement even if the cooperative operation control of the motor generator and the engaging control by the lock-up-controlling means are continued. In this case, the control system terminates these controls to avoid wasteful consumption of electrical power by the motor generator and to let the power transmission characteristic of the torque converter take charge of the condition.

Furthermore, after the start of the cooperative operation control and the lock-up engaging control, if the slip ratio remains continuously in the range between the third threshold value and the second threshold value beyond a predetermined time period, then the control system terminates the cooperative operation of the motor generator to avoid electrical power consumption although it continues the lock-up engaging control.

When the control system terminates the cooperative operation of the motor generator, it brings the driving torque of the motor generator gradually to a target torque value to prevent fluctuations in the driving torque. As a result, the control system according to the present invention provides a smooth driving characteristic.

While the vehicle is moving along with the accelerator pedal being released from its stepped down condition and the motor generator is being operated in cooperation, if the accelerator pedal is stepped down, then the control system terminates the cooperative operation control of the motor generator and the engaging control of the lock-up clutch and immediately sets the driving torque of the motor generator and the engine as the target torque value. In this way, the control system ensures responsibility to the actuation of the accelerator pedal, so it can bring the vehicle, which has been coasting, into acceleration quickly.

According to the second aspect of the present invention, a control system is provided for a hybrid vehicle that comprises an engine, a motor generator and an automatic transmission and that is driven by the driving force from at least one of the engine and the motor generator being transmitted through the automatic transmission to wheels. The control system comprises a shift controller (for example, the hydraulic control valve 12 and the control unit 15 described in the following embodiment), which executes an automatic shift control on the automatic transmission in response to changes in the driving condition, and a motor controller (for example, the power drive unit 11 and the control unit 15 described in the following embodiment), which controls the operation of the motor generator. While the vehicle is moving along with the accelerator pedal being released from its stepped down condition, if the shift controller executes an automatic shifting, then the motor controller operates the motor generator in cooperation for bringing the input-side rotational speed of the automatic transmission at the start of the shifting closer to the input-side rotational speed that corresponds to the gear ratio after the shifting. In addition, the control system executes the cooperative operation control to make the total braking torque against the wheels to a value larger than the braking torque of the engine (engine friction torque).

In this case, it is preferable that the timing for starting the cooperative operation control be set on the basis of a shift control command value issued by the shift controller and of the progress of the shifting. It is also preferable that the cooperative operation control be executed in feedback control on the basis of a feedback gain that is set in correspondence to the speed change ratio set by the automatic shift control. Furthermore, it is preferable that the control system terminate the cooperative operation control when the progress of the shifting reaches a predetermined value. For example, the control system may terminate the cooperative operation control when the cooperative operation control has been executed for a time period that is predetermined correspondingly to a type of the shifting.

In the control executed by this control system, while the vehicle is moving along with the accelerator pedal being released from its stepped down condition, if the cooperative operation is to be terminated, then the control system preferably brings the driving torque of the motor generator gradually to a target torque value.

Also, while the vehicle is moving along with the accelerator pedal being released from its stepped down condition, and the cooperative operation is being executed, if the accelerator pedal is stepped down, then the control system preferably terminates the cooperative operation of the motor generator and controls the driving torque of the motor generator and the engine to come to a target torque value.

According to the control system of the present invention, in a case where an automatic shifting is performed while the vehicle is moving along with the accelerator being released, the control system operates the motor generator in cooperation. More specifically, the control system executes the cooperative operation control to make the total braking torque against the wheels to a value larger than the braking torque of the engine (engine friction torque), which surely prevents the motor generator from generating a torque which would otherwise act to increase the rotational speed of the engine for an acceleration of the vehicle during a downshifting. As a result, the control system, while it is executing energy regeneration, can provide smooth shifting, which does not give the driver a sense of incongruity.

In the shift control, the control system determines the timing for starting the cooperative operation control in correspondence to the shift control command value and the progress of the shifting, and it controls the cooperative operation in feedback control on the basis of a feedback gain that is set in correspondence to the speed change ratio. In addition, the control system terminates the cooperative operation when the progress of the shifting reaches a predetermined value or when the cooperative operation has been executed for a time period that is predetermined for the type of the shifting. As a result, the control system provides a smooth shifting operation without any feel of incongruity.

It is preferable that the control system bring the driving torque of the motor generator to a target torque value before it terminates the cooperative operation. This action prevents fluctuations in the driving torque while the motor generator is being operated in cooperation, so the control system can achieve a smooth shifting operation.

In a case where the motor generator is being operated in cooperation while the vehicle is moving along with the accelerator pedal being released, if the accelerator pedal is stepped down, then the control system terminates the cooperative operation and immediately sets the driving torque of the motor generator and the engine as the target torque value. As a result, the control system can quickly bring the vehicle, which has been coasting, into a powered mode, so the control system has a good responsibility to the actuation of the accelerator.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only and thus are not limitative of the present invention.

FIGS. 6A-6F are time charts describing a second control example executed by the control system according to the present invention.

FIGS. 11A-11G are time charts describing a control example executed by the control system according to the present invention.

DESCRIPTION OF THE PREFERRED EMBODIMENTS

Figure 1:
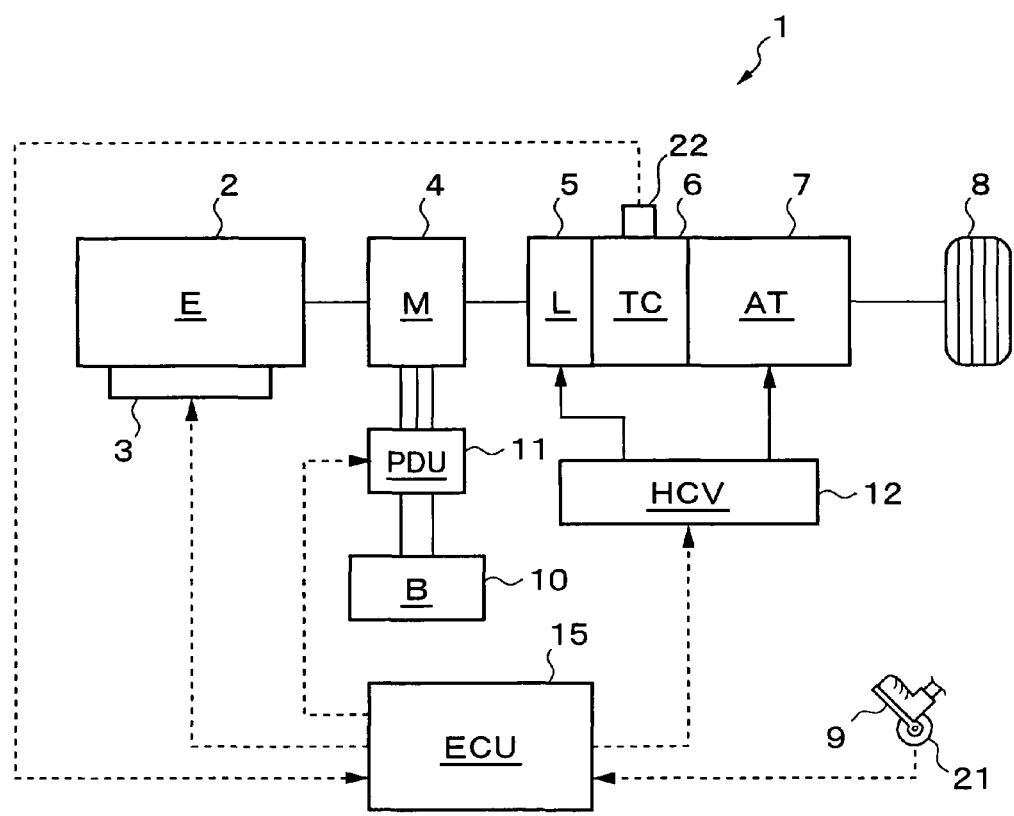
FIG. 1 is a schematic diagram describing the construction of a drive system used for a hybrid vehicle, which includes a control system according to the present invention.

Now, preferred embodiments according to the present invention are described in reference to the drawings.
Construction of Drive System
At first, the construction of a drive system used for a hybrid vehicle, which is equipped with a control system according to the present invention, is described in reference to FIG. 1.

This hybrid vehicle 1 comprises an engine 2 and an electricity-generating motor (referred to as motor generator) 4 as drive sources, which are connected in series. The vehicle also comprises a torque converter 6, which is connected to the drive sources and equipped with a lock-up clutch 5, and an automatic ratio-change mechanism 7, whose output shaft is connected to drive wheels 8. In this arrangement, the driving force applied alternatively from the engine 2 or the motor generator 4 or simultaneously from these two is transmitted through the torque converter 6 with the lock-up clutch 5 and the automatic ratio-change mechanism 7 to the wheels 8, driving the hybrid vehicle 1, with rotational speed changes being effected by the torque converter 6 and the automatic ratio-change mechanism 7.

In addition, the driving force from the wheels 8 during the deceleration of the vehicle, after the accelerator pedal 9 is released, is transmitted through the automatic ratio-change mechanism 7 and the torque converter 6 with the lock-up clutch 5 to the drive sources. In this case, the engine brake action (braking action by the friction torque of the engine) is effected by the engine 2, and the motor generator 4 is driven by the driving force for electricity generation (energy regeneration).

The engine 2 is a multi-cylinder reciprocating engine, and it is equipped with a controller 3 for engine operation. The controller 3 controls the fuel injection to and the ignition of each cylinder. In addition, it also controls the operation of the valves to close the suction and exhaust valves of each cylinder for turning the cylinders off The controller 3, which itself is under the control of a control unit 15 described later, executes the automatic start and stop of the engine 2 (so-called, idling-elimination control) and executes a cylinder-off control, which closes the suction and exhaust valves of some or all of the cylinders.

The input member and the output member (the pump member and the turbine member) of the torque converter 6 are engaged or disengaged with each other by the lock-up clutch 5. In the condition where the lock-up clutch 5 is released, the rotational driving force is transmitted between the drive sources (the engine 2 and the motor generator 4) and the automatic ratio-change mechanism 7 through the torque converter 6. On the other hand, if the lock-up clutch 5 is engaged, then the torque converter 6 is bypassed, and the drive sources (the output shaft of the motor generator 4) are connected directly to the input shaft of the automatic ratio-change mechanism 7. The lock-up clutch 5 is actuated for engagement and disengagement by a hydraulic control valve 12, whose operation is controlled by the control unit 15. In other words, the lock-up clutch 5 is controlled for engagement and disengagement by the control unit 15.

The automatic ratio-change mechanism 7 is a ratio-change mechanism that has a plurality of gear trains, of which one desirable train is automatically set in correspondence to the driving condition of the vehicle. This automatic shifting is controlled by a hydraulically actuated shift clutch, whose hydraulic pressure is supplied through the hydraulic control valve 12, which is controlled by the control unit 15. In other words, the automatic shift control is executed by the control unit 15 in correspondence to the driving condition of the vehicle.

The motor generator 4 is driven by the electrical power being supplied from a battery 10 through a power drive unit (PDU) 11, which is controlled by the control unit 15. In other words, the operation of the motor generator 4 is controlled by the control unit 15. In addition, the motor generator 4 is driven by the driving force received from the wheels 8 when the hybrid vehicle 1 is in deceleration. In this case, the motor generator 4 functions as an electric generator that generates energy and also a braking force. Therefore, the motor generator 4 converts energy from the kinetic energy of the vehicle to electrical energy, which is recovered through the power drive unit 11 to charge the battery 10. This energy regeneration through the power drive unit 11 is also controlled by the control unit 15.

For the control unit 15 to control the operation of the engine-operation controller 3, the hydraulic control valve 12 and the power drive unit 11 as described above, the control unit 15 receives various detection signals, for example, as shown in the drawing, a detection signal from an accelerator sensor 21, which detects the stepping on the accelerator pedal 9, and a detection signal from a rotation sensor 22, which detects the input and output rotational speeds of the torque converter 6. In addition, it receives a detection signal from a vehicle speed sensor for the vehicle speed, a detection signal from an engine rotation sensor for the rotational speed of the engine, a detection signal for the shift position of the transmission, a detection signal from a brake sensor for the brake actuation, a detection signal for the remaining charge of the battery, though they are not illustrated in the drawing. The rotational sensor 22, instead of detecting the input and output rotational speeds (Nti, Nto) of the torque converter, may detect the rotational speed Ne of the engine and the rotational speed (Nm) of the input shaft of the ratio-change mechanism.

First Control System

Figure 2:
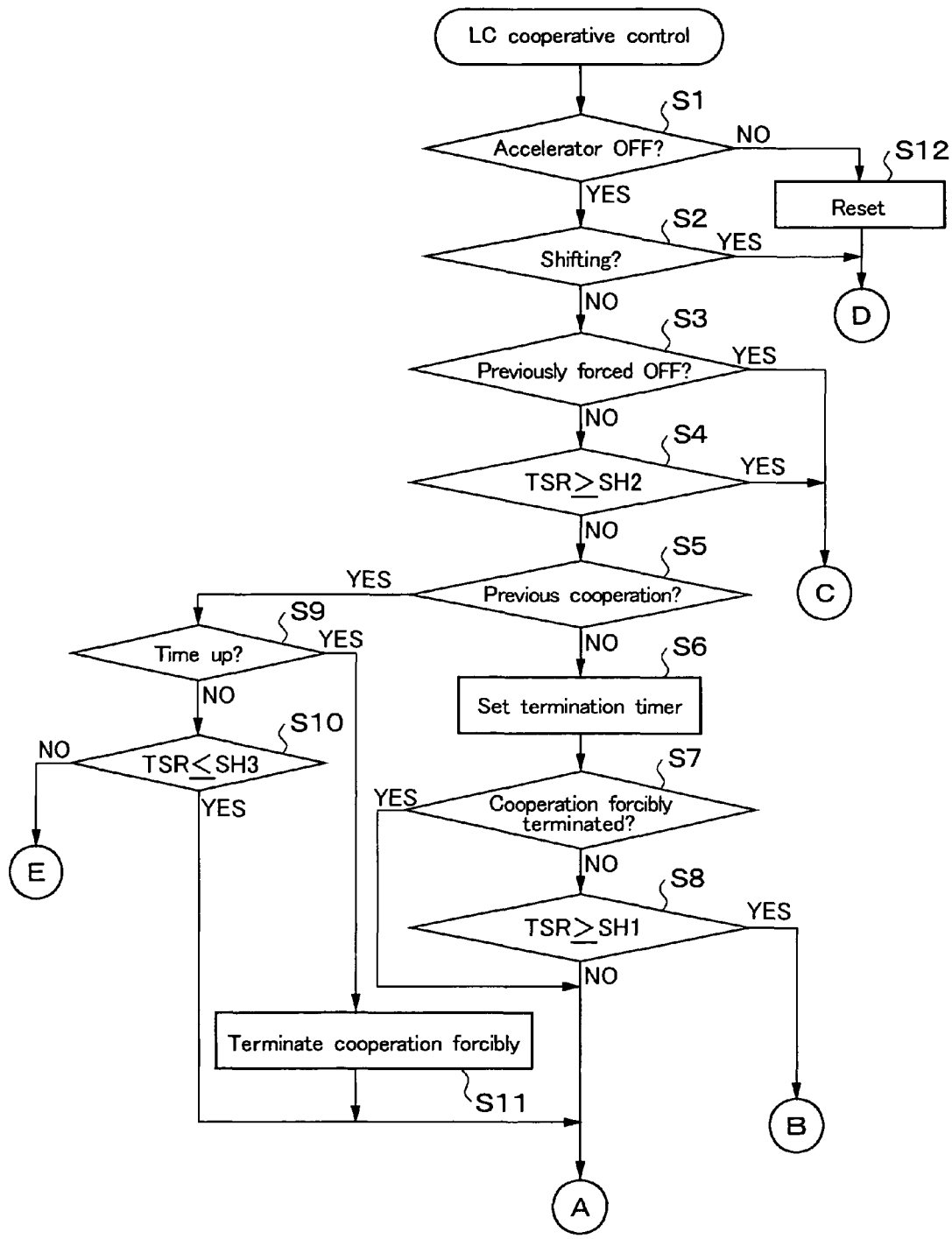
FIG. 2 is a flow chart showing steps of an engagement control for the lock-up clutch and of a cooperative operation control for the motor generator.
Figure 3:
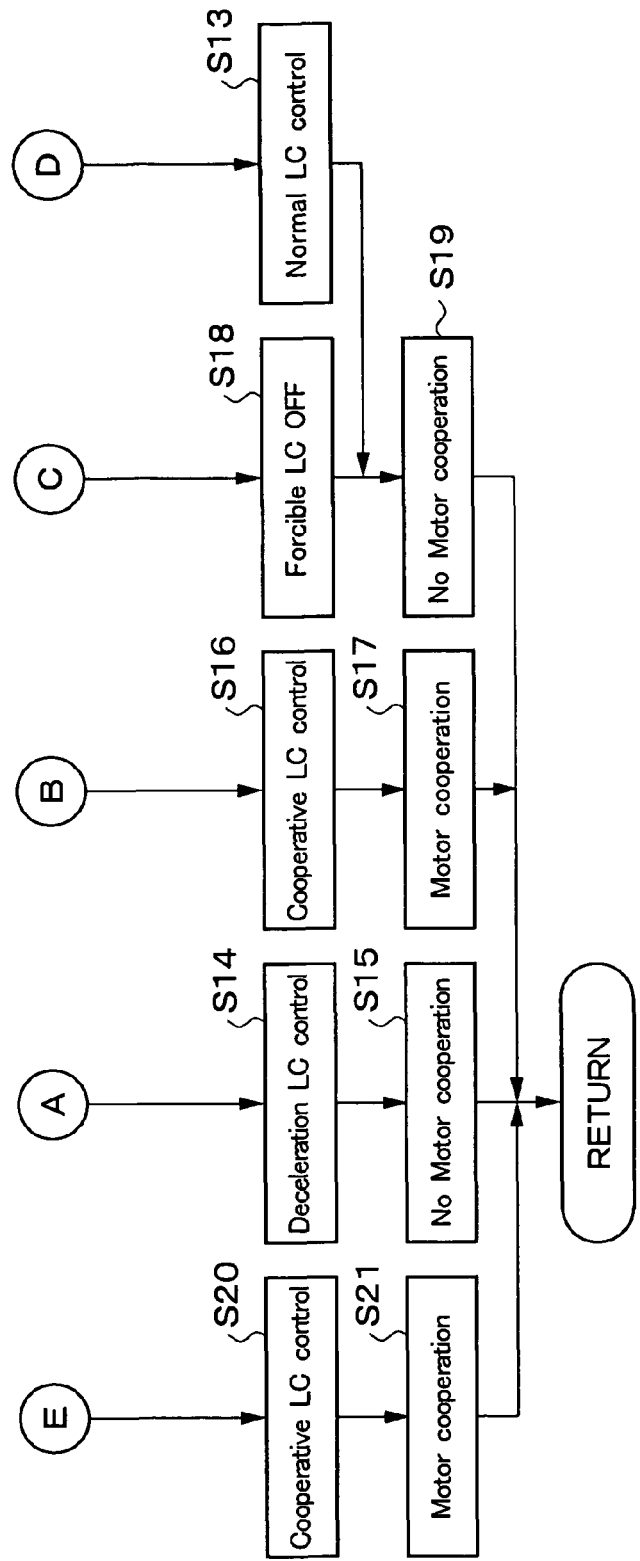
FIG. 3 is a flow chart showing steps of the engagement control of the lock-up clutch and of the cooperative operation control of the motor generator.
Figure 4:
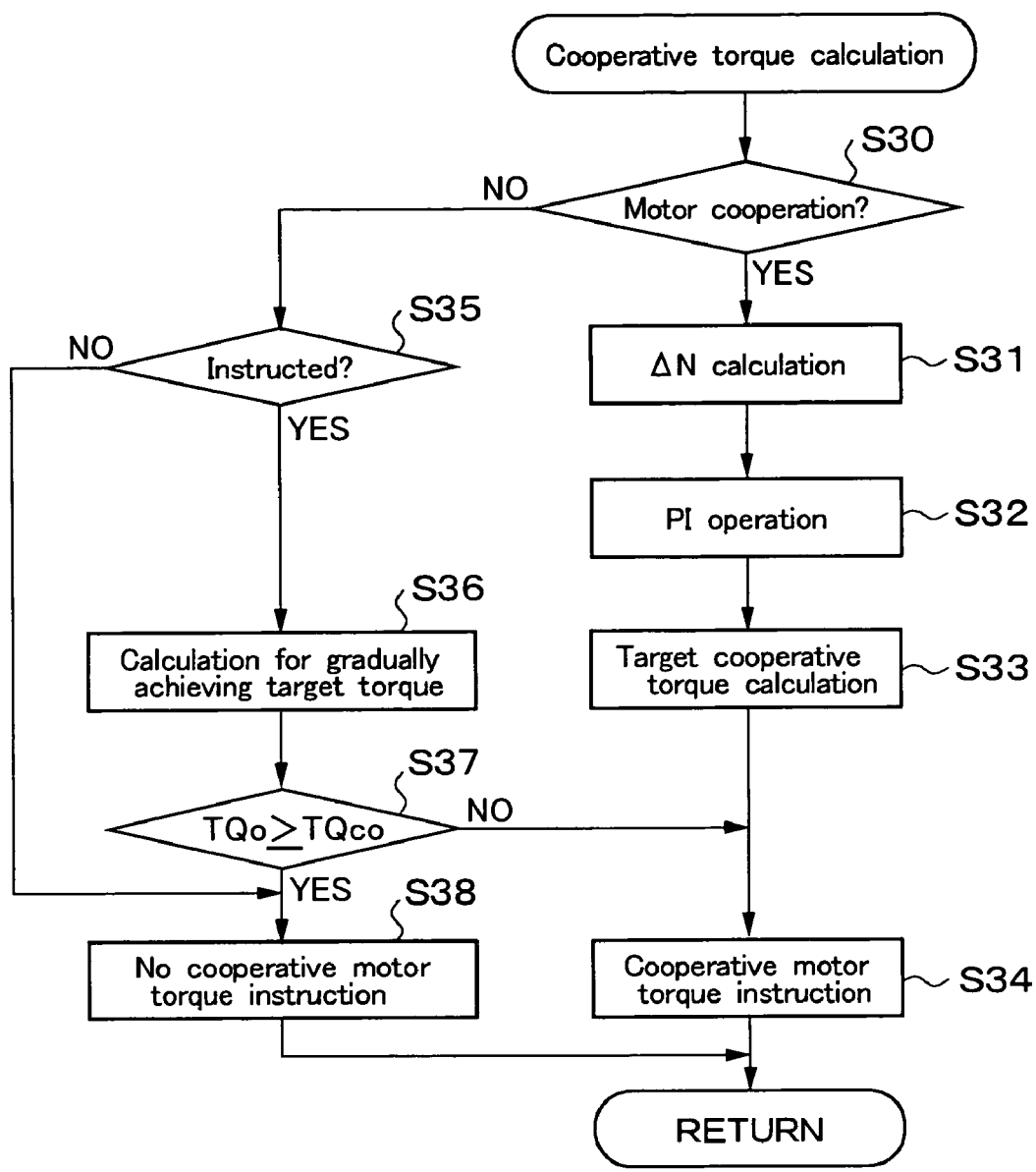
FIG. 4 is a flow chart showing steps of the cooperative operation control of the motor generator.

Now, a control system as a first embodiment according to the present invention is described. This first control system is used for the hybrid vehicle 1, which is constructed as described above, and it is to control the engagement of the lock-up clutch 5 and the operation of the motor generator 4 cooperatively by the power drive unit 11 while the vehicle is being decelerated after the release of the accelerator pedal from its stepped down condition. The steps of this control flow are described in reference to FIG. 2-FIG. 4, which represents a basic control flow. Throughout the charts, the flows are continuous where the identical letters of circled alphabets A-E are placed.

In this control, a determination is made whether the accelerator pedal 9 is released from its stepped down condition (whether it is turned OFF) or not at step S1. If the accelerator pedal 9 remains being stepped down, then this condition is not targeted in this control. In this case, conditional values and the like are reset at step S12, and a normal lock-up control is executed at step S13. Therefore, the operation of the motor generator 4 is not controlled cooperatively for the engagement of the lock-up clutch.

On the other hand, if the accelerator pedal 9 is released from its stepped down condition, then the control flow proceeds to step S2, where another determination is made whether a shifting operation is being performed currently or not. If a shifting is being performed, then the control flow proceeds to step S13. On the other hand, if no shifting is performed currently, then the control flow proceeds to step S3, where another determination is made whether or not the lock-up clutch 5 was controlled to be released forcibly at the previous flow of the control. If the release-forcing control was executed for the lock-up clutch 5 at the previous flow, then the control flow proceeds to step S18, where the lock-up clutch 5 is released forcibly. In this case, the cooperative operation of the motor generator 4 is not executed at step S19.

If there was no forcible release at the previous flow, then the control flow proceeds to step S4, where a determination is made whether or not the slip ratio TSR of the torque converter 6 is larger than a second threshold value SH2. The slip ratio TSR is calculated based on a detection signal from the rotational sensor 22, which detects the input and output rotational speeds of the torque converter 6. Practically, it is calculated by equation (1) below, from the input rotational speed Nti (=the rotational speed Ne of the engine) and the output rotational speed Nto (=the rotational speed Nm of the input shaft of the ratio-change mechanism) of the torque converter 6. It is clearly understood from equation (1) that slip ratio TSR=100% means no slip. In the explanation below, the slip ratio TSR (%) calculated by equation (1) is used. However, slip quantity may be used instead of the slip ratio.

$$TSR = (Nto/Nti) \times 100 (\%) \quad (1)$$

The second threshold value SH2, which is used at step S4, is a value considered that if the degree of the slip is larger than this value, then it is difficult or unfavorable to bring the lock-up clutch 5 into engagement even though the motor generator 4 is driven in cooperation. This value is set at, for example, SH2=120%. If TSR≧SH2, then it is difficult or unfavorable to bring the lock-up clutch 5 into engagement even though the motor generator 4 is driven in cooperation. In this case, the control flow proceeds to step S18, where the lock-up clutch 5 is released forcibly, and the cooperative operation of the motor generator 4 is not executed at step S19.

On the other hand, in the case of TSR<SH2, the control flow proceeds to step S5, where a determination is made whether or not the cooperative operation was performed at the previous flow. If the cooperative operation was not performed at the previous flow, then the control flow proceeds to step S6, where a cooperative control termination timer is set. Another determination is made at step S7 whether or not the cooperative operation has been terminated forcibly. If it has been terminated forcibly, then the control flow proceeds to step S14 and to step S15, where only a deceleration lock-up control, which will be described later, is executed without execution of the cooperative operation.

If the result of the determination at step S7 is that the cooperative operation has not terminated forcibly, then the control flow proceeds to step S8, where another determination is made whether or not the slip ratio TSR of the torque converter 6 is larger than a first threshold value SH1. The first threshold value SH1 is a value considered that if the degree of the slip is equal to or larger than this value, then it is difficult to bring the lock-up clutch 5 into engagement only by the lock-up control. This value is set at, for example, SH1=110%. If TSR≧SH1, i.e., SH1≦TSR<SH2 because the determination at step S4 is TSR<SH2, namely 110%≦TSR<120%, then the control flow proceeds to step S16 and to step S17, where a cooperative lock-up control, which will be described later, is executed, and the cooperative operation of the motor generator 4 is executed.

If the result of the determination at step S8 is that TSR<SH1, indicating that the slip ratio is small enough to bring the lock-up clutch 5 into engagement only by the execution of the lock-up control, then the control flow proceeds to step S14 and to step S15. There, only the deceleration lock-up control is executed without execution of the cooperative operation.

On the other hand, if the result of the determination at step S5 is that the cooperative operation was executed at the previous flow, then the control flow proceeds to step S9, where a determination is made whether the time set on the cooperative control termination timer at step S6 has already elapsed or not. If the time is up, then the control flow proceeds to step S11, where the cooperative operation is terminated forcibly. Then, it proceeds to step S14 and to step S15, where only the deceleration lock-up control is executed without execution of the cooperative operation.

If the time set on the cooperative control termination timer has not elapsed yet, then the control flow proceeds to step S10, where a determination is made whether or not the slip ratio TSR of the torque converter 6 is smaller than a third threshold value SH3. The third threshold value SH3 is a value that represents a very small slip ratio, and the lock-up clutch 5 can be brought immediately into engagement without any problem. This value is set at, for example, SH3=101%. If TSR>SH3, then the control flow proceeds to step S20 and to step S21, where the cooperative lock-up control is executed, and the cooperative operation of the motor generator 4 is executed. On the other hand, if the slip ratio has decreased to TSR≦SH3, then the control flow proceeds to step S14 and to step S15, where only the deceleration lock-up control is executed without execution of the cooperative operation.

Now, explanations are given of the deceleration lock-up control and the cooperative lock-up control. It can be understood from the above descriptions that the deceleration lock-up control is a control for bringing the lock-up clutch 5 into engagement when the slip ratio TSR is smaller than the first threshold value SH1 (=110%) or when the slip ratio has become equal to or smaller than the third threshold value SH3 (=101%) by the cooperative operation. In the deceleration lock-up control, the lock-up clutch 5 is supplied with a predetermined, comparatively high pressure, which is referred to as deceleration lock-up control pressure PLC(D).

The cooperative lock-up control, which starts when the slip ratio TSR has come into SH1≦TSR<SH2, is a control for bringing the lock-up clutch 5 into engagement under the cooperative operation of the motor generator 4. In the cooperative lock-up control, the lock-up clutch 5 is supplied with a cooperative lock-up control pressure PLC(C), which is lower than the deceleration lock-up control pressure PLC(D). In this case, the cooperative operation of the motor generator 4 is executed as follows according to the control flow shown in FIG. 4.

At first, a determination is made at step S30 whether a cooperative motor control is being executed or not, in other words, whether the above mentioned step S17 or step S21 is being executed or not. If the cooperative motor control is being executed, then the control flow proceeds to step S31, where a calculation is made for the difference ΔN (=Nti−Nto or =Ne−Nm) between the input and output rotational speeds of the torque converter. This rotational speed difference ΔN is processed for a PI (proportional integral) with respect to time t to calculate a target torque increment ΔTQ at step S32, and the target torque increment ΔTQ is added to the current target cooperative torque TQco to calculate a new target cooperative torque TQco at step S33. Based on this calculation, the motor generator 4 is controlled to output the target cooperative torque TQco. In this case, a flag with a cooperative motor torque instruction is set up at step S34.

On the other hand, if the result of the determination at step S30 is that there is no cooperative motor control, then the control flow proceeds to step S35, where another determination is made whether a flag with a cooperative motor torque instruction is up or not. A flag with this instruction is up immediately after the cooperative motor control, and in this case, the control flow proceeds to step S36, where the driving torque of the motor generator 4 is calculated for bringing the cooperative motor torque TQco of the motor generator 4 gradually to the target torque TQo. This calculation is continued until Tqo≧TQco is satisfied at step S37. If Tqo≧TQco, then the control flow proceeds to step S38, where a flag with no cooperative motor torque instruction is set up.

However, if the result of the determination at step S35 is that a flag with a cooperative motor torque instruction is not up, i.e., a flag with no cooperative motor torque instruction is up, then the control flow proceeds to step S38, where the flag with no cooperative motor torque instruction is maintained.

Now, specific examples of control are described in reference to FIG. 5-FIG. 8, which are time charts each describing a different example. In each example, while the vehicle is accelerating, the accelerator pedal from its stepped down condition is released by the driver at time t0 for a deceleration. After the release of the accelerator pedal, the opening of the accelerator becomes equal to or smaller than a predetermined opening at time t1. At this moment, the accelerator is judged as turned off, and a lock-up control is initiated. These time charts show changes in various parameters, which include the rotational speeds of the engine and of the input shaft of the transmission (i.e., the rotational speeds of the input and output shafts of the torque converter) N, the slip ratio TSR of the torque converter, the lock-up clutch control pressure PLC and the torque TQ transmitted through the transmission.

Example 1

In the first example, which is shown in FIG. 5, when the accelerator is judged as being off at time t1, no shifting is being executed, and no forced release of the lock-up clutch has been executed recently. For this situation, the control flow shown in FIG. 2 proceeds from step S1 to step S2 and step S3 to step S4. In this instance, the engine rotational speed Ne (=the input rotational speed of the torque converter Nti) is higher than the rotational speed Nm of the input shaft of the transmission (=the output rotational speed Nto of the torque converter) as shown in (B). Therefore, the slip ratio TSR of the torque converter 6 is smaller than 100%, and TSR<SH2 (with SH2=120%) as shown in (C). As a result, the control flow proceeds to step S5.

In addition, no cooperative operation has been executed recently, and no forced termination of the cooperative operation has been executed recently. As a result, the control flow proceeds from step S5 to step S6, where the termination timer is set, and then, it proceeds through step S7 to step S8. As mentioned above, the slip ratio TSR is smaller than 100%, so TSR<SH1 (with SH1=110%). As a result, the control flow proceeds to step S14 and to step S15, where the deceleration lock-up control is executed without execution of the cooperative operation of the motor generator 4.

In the deceleration lock-up control, the lock-up clutch 5 is supplied with the lock-up clutch control pressure PLC, which is increased at time t1 and thereafter as shown in (D), achieving the deceleration lock-up control pressure PCL(D). With this pressure, the lock-up clutch 5 is controlled to come into engagement. On the other hand, because the accelerator is off, the rotational speed Ne of the engine decreases close to the rotational speed Nm of the input shaft of the transmission as shown in (B). As the rotational speed Ne of the engine falls below the rotational speed Nm of the input shaft of the transmission, the engaging control of the lock-up clutch 5 is being executed. As a result, after the rotational speed Ne falls below the rotational speed Nm a little, both the rotational speeds becomes identical in response to the engagement of the lock-up clutch 5.

As described above, in the first example, when the vehicle decelerates, only the deceleration lock-up control is initiated to bring the lock-up clutch 5 into engagement. This is a case where the lock-up clutch 5 is brought into engagement while the slip ratio TSR never increases to the first threshold value SH1. In this case, because the cooperative operation control of the motor generator 4 is not executed, there is no cause for the driver to feel a sense of incongruity in the driving.

Figure 5A:
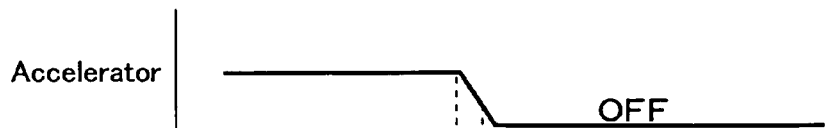
FIGS. 5A-5E are time charts describing a first control example executed by the control system according to the present invention.
Figure 5B:
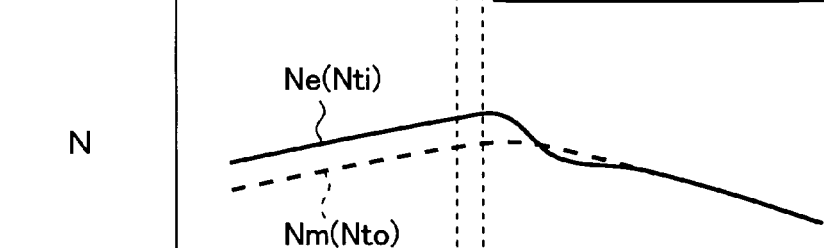
Figure 5C:
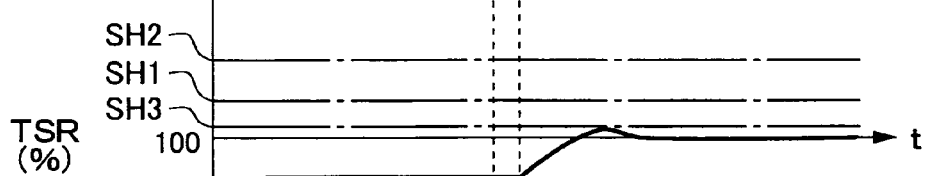
Figure 5D:
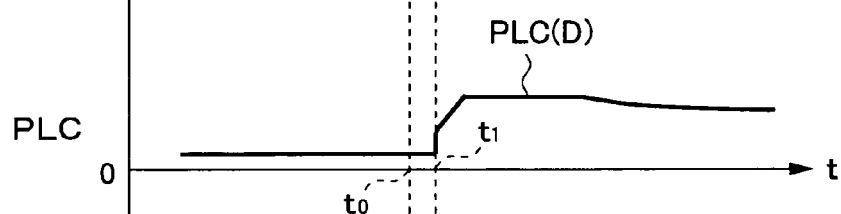
Figure 5E:
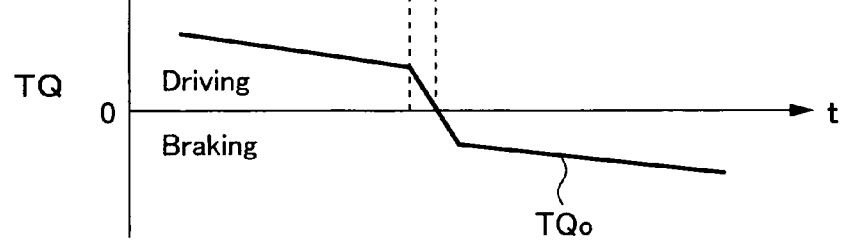
Figure 7A:
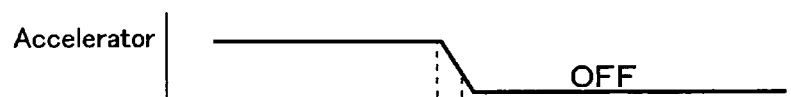
FIGS. 7A-7E are time charts describing a third control example executed by the control system according to the present invention.
Figure 7B:
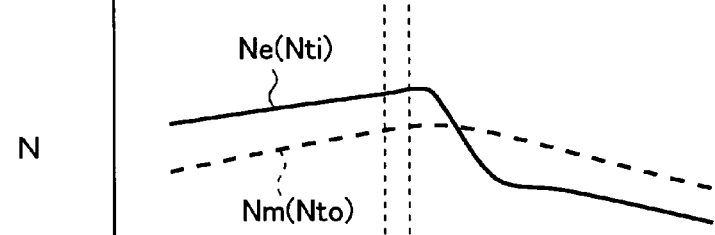
Figure 7C:
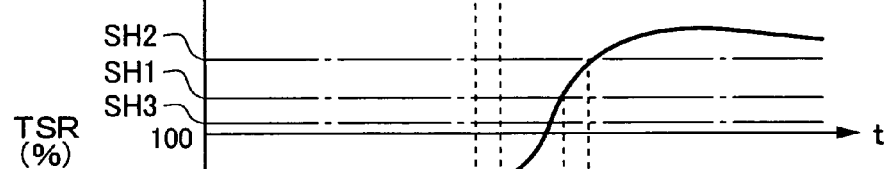
Figure 7D:
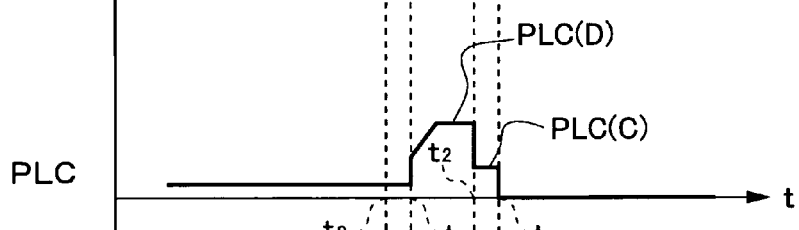
Figure 7E:
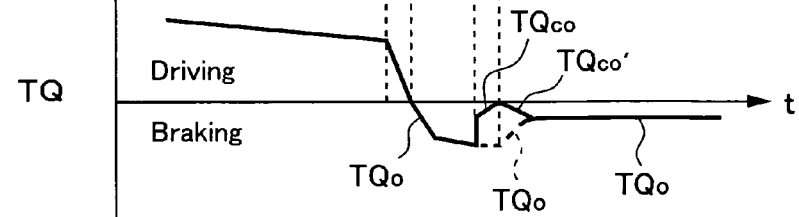
Figure 8A:
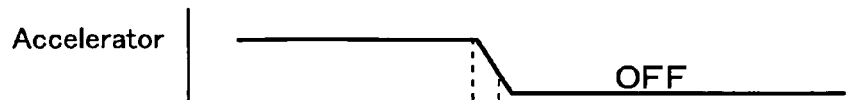
FIGS. 8A-8E are time charts describing a fourth control example executed by the control system according to the present invention.
Figure 8B:
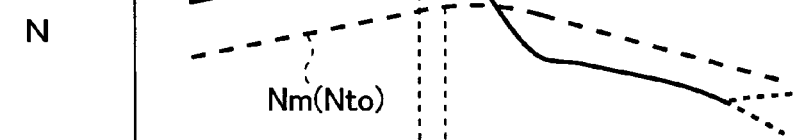
Figure 8C:
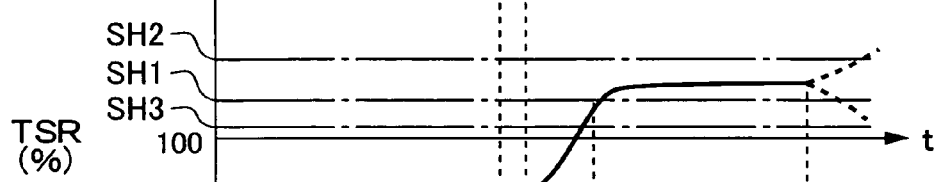
Figure 8D:
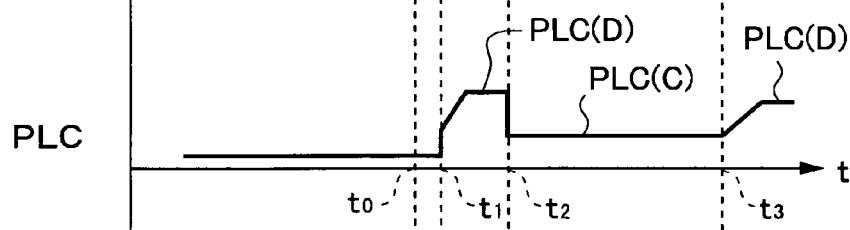
Figure 8E:
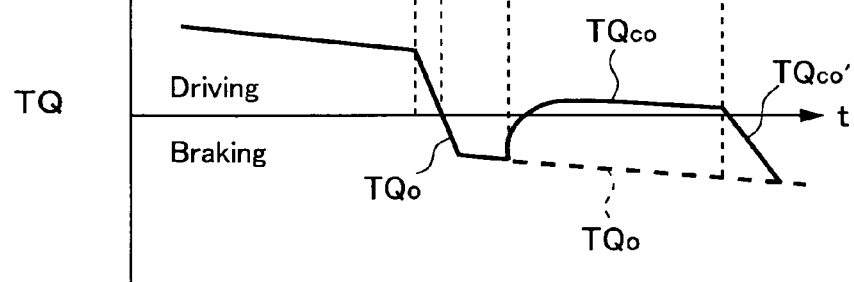

FIG. 5(E) shows chronological changes in the torque TQ transmitted through the transmission, which torque value is converted as the value on the output shaft of the engine 2 and the motor generator 4 (or the input shaft of the torque converter 6). When the accelerator pedal is released, the transmission torque TQ falls, and its value comes on the braking side (i.e., the side where a so-called engine-brake action occurs) and is set at a predetermined target torque TQo. This target torque TQo is the torque output from the wheel side and is determined from the driving conditions of the vehicle, which include the accelerator opening, the vehicle speed, the engine rotational speed, the speed change ratio and the braking action, and it is set at a predetermined decelerating torque while the vehicle decelerates. During the deceleration, an idling-elimination control and a cylinder-off control of the engine 2 are executed, so the friction torque of the engine (the torque from the wheel side necessary for rotating the engine) is kept relatively small. At the same time, the motor generator 4 is operated for energy regeneration. Therefore, the target torque TQo corresponds with the total of the friction torque TQEF of the engine and the regeneration torque TQMJ of the motor generator.

Example 2

FIG. 6 shows a second example. In this example, the conditions at time t1 are the same as the first example, so the control flow proceeds to step S14 and to step S15, where the deceleration lock-up control is initiated without execution of the cooperative operation of the motor generator 4. As a result, the lock-up clutch control pressure PLC, which is supplied to the lock-up clutch 5, is increased at time t1 and thereafter as shown in (D), for starting the control of bringing the lock-up clutch 5 into engagement. Because the accelerator is turned off, the rotational speed Ne of the engine decreases greatly beyond the rotational speed Nm of the input shaft of the transmission, and the slip ratio TSR increases above the first threshold value SH1 at time t2 as shown in (C).

Therefore, the control flow proceeds from step S8 to step S16 and to step S17, where the cooperative lock-up control is executed, and the cooperative operation of the motor generator 4 is executed. In this instance, the lock-up clutch control pressure PLC is lowered and adjusted to the cooperative lock-up control pressure PCL(C) at time t2 as shown in (D), and the cooperative operation is executed for controlling the torque output from the motor generator 4 to bring the transmission torque TQ of the transmission to a target cooperative torque TQco, which is larger than the target torque TQo, as shown in (E). The target cooperative torque TQco is calculated and set by the process from step S31 to step S33 in the flow chart shown in FIG. 4.

When the cooperative operation is executed, the fall of the engine rotational speed Ne is stopped as shown in (B), and the slip ratio TSR, which has been increasing, changes to decrease and comes to TCR<SH3 (=101%) at time t3. At this moment, the cooperative operation is terminated. The lock-up clutch control pressure PLC is returned to the deceleration lock-up control pressure PCL(D) at time t3 as shown in (D), and also the target cooperative torque TQco is returned gradually to the target torque TQo as indicated by line Tqco' in (E) (refer to step S36). As a result, the engaging operation of the lock-up clutch 5 is performed smoothly.

FIG. 6(F) shows a case where the target torque TQo increases by a stepping down of the accelerator pedal at time t4 after the control that returns the target cooperative torque TQco gradually to the target torque TQo has started at time t3. In this case, the control that returns the target cooperative torque TQco gradually to the target torque TQo is cancelled, and the control that brings the target cooperative torque TQco immediately to the target torque TQo is executed. Alternate long and short dash line Tqo' shown in (F) indicates the target torque that would exist otherwise if the accelerator pedal were not stepped down as a reference.

Example 3

FIG. 7 shows a third example. Also in this example, the conditions at time t1 are the same as the first example, so the control flow proceeds to step S14 and to step S15, where the deceleration lock-up control is initiated without execution of the cooperative operation control of the motor generator 4. As a result, the lock-up clutch control pressure PLC, which is supplied to the lock-up clutch 5, is increased at time t1 and thereafter as shown in (D), for starting the control of bringing the lock-up clutch 5 into engagement. Because the accelerator is turned off, the rotational speed of the engine decreases greatly beyond the rotational speed Nm of the input shaft of the transmission, and the slip ratio TSR increases above the first threshold value SH1 at time t2 as shown in (C).

Therefore, the control flow proceeds from step S8 to step S16 and to step S17, where the cooperative lock-up control is executed, and the cooperative operation of the motor generator 4 is executed. In this instance, the lock-up clutch control pressure PLC is lowered and adjusted to the cooperative lock-up control pressure PCL(C) at time t2 as shown in (D), and the cooperative operation is executed for controlling the torque output from the motor generator 4 to bring the transmission torque TQ of the transmission to a target cooperative torque TQco, which is larger than the target torque TQo, as shown in (E).

However, in this example, even though the cooperative operation has been executed, the rotational speed Ne of the engine is not prevented from falling as shown in (B). As a result, the slip ratio TSR increases, reaching $TCR \geq SH2$ (=120%) at time t3. Therefore, the control flow proceeds from step S4 at time 3 to step S18 and to step S19, where the engaging control of the lock-up clutch 5 is cancelled halfway, and the cooperative operation of the motor generator 4 is also cancelled. As a result, the transmission of the driving force at time t3 and thereafter is through the torque converter 6, and the target cooperative torque TQco is returned gradually to the target torque Tqo' after time t3 as indicated by line TQco in (E) (refer to step S36).

Example 4

FIG. 8 shows a fourth example. Also in this example, the conditions at time t1 are the same as the first example, so the control flow proceeds to step S14 and to step S15, where the deceleration lock-up control is initiated without execution of the cooperative operation of the motor generator 4. As a result, the lock-up clutch control pressure PLC, which is supplied to the lock-up clutch 5, is increased at time t1 and thereafter as shown in (D), for starting the control of bringing the lock-up clutch 5 into engagement. Because the accelerator is turned off, the rotational speed of the engine decreases greatly beyond the rotational speed Nm of the input shaft of the transmission, and the slip ratio TSR increases above the first threshold value SH1 at time t2 as shown in (C).

Therefore, the control flow proceeds from step S8 to step S16 and to step S17, where the cooperative lock-up control is executed, and the cooperative operation of the motor generator 4 is executed. In this instance, the lock-up clutch control pressure PLC is lowered and adjusted to the cooperative lock-up control pressure PCL(C) at time t2 as shown in (D), and the cooperative operation is executed for controlling the torque output from the motor generator 4 to bring the transmission torque TQ of the transmission to a target cooperative torque TQco, which is larger than the target torque TQo, as shown in (E).

In this example, although the rotational speed Ne of the engine is prevented from falling as shown in (B), the slip ratio TSR remains in the range between the first threshold value SH1 and the second threshold value SH2. In such a case, if this condition continues until time t3, i.e., for a predetermined time period, then the cooperative operation of the motor generator 4 is terminated at time t3 to avoid electric power consumption although the control of the lock-up clutch 5 is continued. However, at this moment, the engaging control of the lock-up clutch 5 shifts to the deceleration lock-up control. As a result, after time t3, the lock-up clutch 5 is supplied with the deceleration lock-up control pressure PC(D), and after time t3, the target cooperative torque TQco is returned gradually to the target torque TQo as indicated by line Tqco' in (E).

In this case, after time t3, only the deceleration lock-up control of the lock-up clutch 5 is executed without execution of the cooperative operation control. As a result, in response to changes in the driving condition, when the slip ratio TSR decreases, the lock-up clutch 5 is brought into engagement, but when the slip ratio increases beyond the second threshold value SH2, the lock-up clutch 5 is brought into disengagement.

Second Control System

Figure 9:
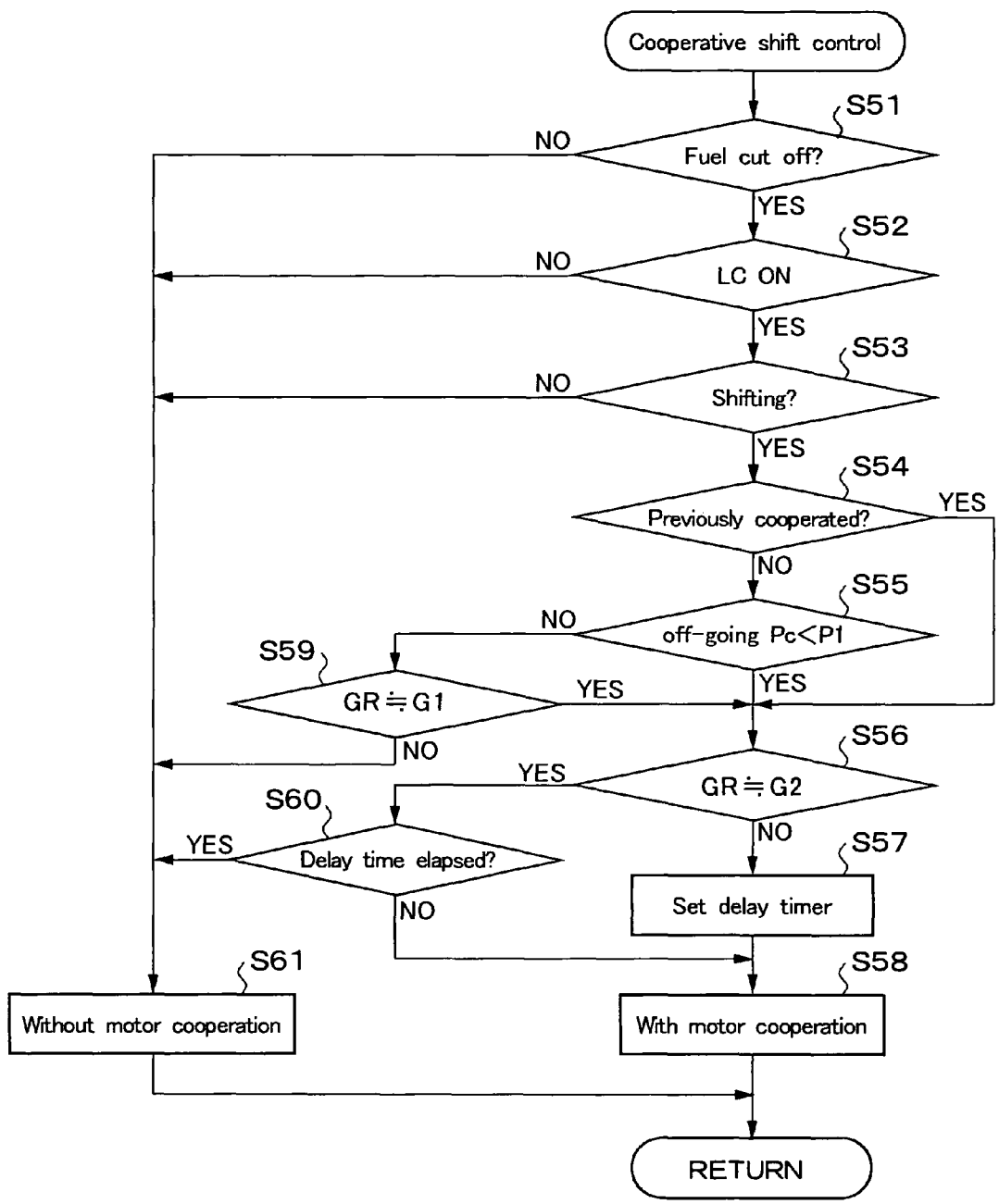
FIG. 9 is a flow chart showing steps of a shift control executed during a deceleration of the vehicle and of the cooperative operation control of the motor generator, which controls are executed by the control system.

Now, another control system is described as a second embodiment of the present invention. The second control system is used for the hybrid vehicle 1, which is constructed as shown in FIG. 1. This control system is to control the shifting operation of the automatic ratio-change mechanism 7, the engagement of the lock-up clutch 5 and the operation of the motor generator 4 cooperatively by the power drive unit 11 while the hybrid vehicle 1 is being decelerated after the release of the accelerator pedal from its stepped down condition. The steps of this control flow are described in reference to FIG. 9 and FIG. 10.

In this control, a determination is made at step S51 whether or not the fuel supply has been cut off while the vehicle is decelerating with the accelerator being released. If the fuel supply is not cut off currently, then the main operation of this control is not executed. In this case, the control flow proceeds to step S61, where a flag to indicate that there is no cooperative operation of the motor generator 4 is set up (this flag is referred to as flag with no motor-cooperation indication), and this turn of the control flow ends. On the other hand, if the fuel is cut off currently, then the control flow proceeds to step S52, where another determination is made whether or not the lock-up clutch 5 is engaged currently. If the lock-up clutch 5 is disengaged, then the main operation of this control is not executed. In this case, a flag with no motor-cooperation indication is set up at step S61, and this turn of the control flow ends. On the other hand, if the lock-up clutch 5 is engaged, the control flow proceeds to step S53, where another determination is made whether or not a shifting is being executed. If a shifting is not being executed, then a flag with no motor-cooperation indication is set up at step S61, and this turn of the control flow ends.

On the other hand, if a shifting is being performed, then the control flow proceeds to step S54, where a determination is made whether or not the cooperative operation control of the motor generator 4 was executed in the previous turn of the flow (i.e., immediately before this turn). This determination is based on the flags that are set up at step S58 and at step S61. If the cooperative operation control was not executed in the previous turn, the control flow proceeds to step S55, where another determination is made whether or not the hydraulic pressure being supplied to the clutch of an off-going gear ratio (this pressure is referred to as off-going ratio clutch pressure Pc(OFF)) is equal to or lower than a first judgment pressure P1.

If Pc(OFF)>P1, then the control flow proceeds to step S59, where a determination is made whether or not the gear ratio GR that indicates the progress of the shifting has reached a first judgment gear ratio G1. If it has not reached this judgment gear ratio, then a flag with no motor-cooperation indication is set up at step S61, and this turn of the control flow ends. On the other hand, if the gear ratio GR has reached the first judgment gear ratio G1, then the control flow proceeds to step S56. The gear ratio GR that indicates the progress of the shifting is to indicate the progress of the shifting by numbers. For example, when a downshift is performed from the fourth speed ratio (GR=4) to the third speed ratio (GR=3), if the shifting is halfway, then this condition is represented by GR=3.5. This progress is calculated proportionally from the fourth speed ratio equivalent and the third speed ratio equivalent of the rotational speed Nm of the input shaft of the transmission (=the rotational speed Ne of the engine).

On the other hand, if the result of the determination at step S55 is that Pc(OFF)≦P1, then the control flow proceeds also to step S56. It is understood from this that the control flow proceeds to step S56 when the gear ratio GR indicating the shifting progress reaches the first judgment gear ratio G1 or when the off-going ratio clutch pressure Pc(OFF) is equal to or lower than the first judgment pressure P1.

At step S56, a determination is made whether or not the gear ratio GR indicating the shifting progress has reached a second judgment gear ratio G2 (this value indicates that the shifting has progressed further toward the on-coming speed ratio from the condition indicated by the first judgment gear ratio). If it has not reached the second judgment gear ratio G2, then a delay timer Δt is set at step S57, and a flag with a motor-cooperation indication is set up at step S58, and then this turn of the flow ends. On the other hand, if the gear ratio GR has reached the second judgment gear ratio G2, then a determination is made at step S60 whether or not the time set on the delay timer has elapsed. Until the time is up, the control flow proceeds to step S58, where a flag with a motor-cooperation indication is set up. When the time is up, the control flow proceeds to step S61, where a flag with no motor-cooperation indication is set up, and this turn of the control flow ends. The value set on the delay timer is determined in correspondence to the type of the shift, which includes, for example, gear ratios involved, and whether the shift is an upshift or a downshift.

Figure 10:
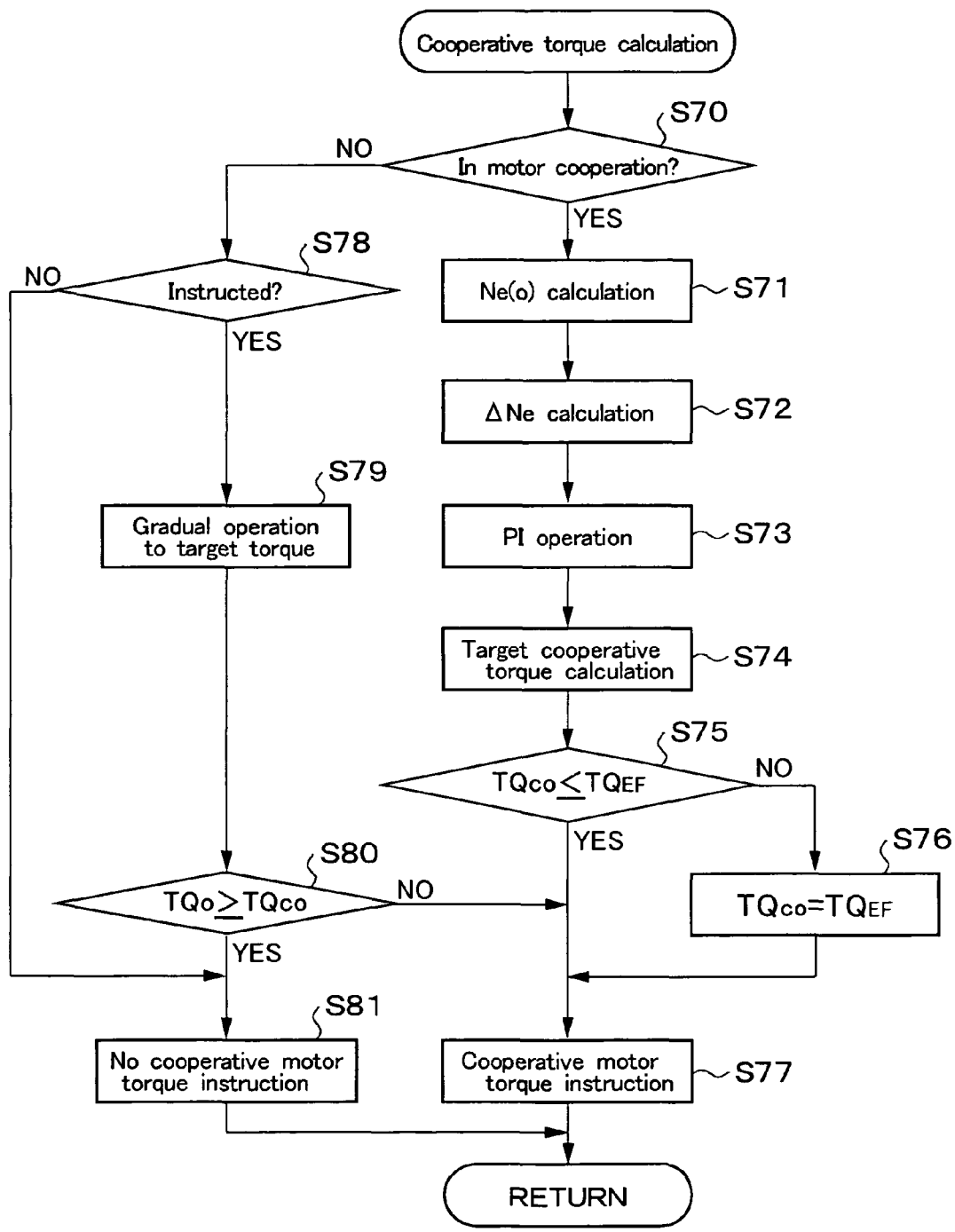
FIG. 10 is a flow chart showing steps of the cooperative operation control of the motor generator.

On the basis of the flag with a motor-cooperation indication, the cooperative operation of the motor generator 4 during the shifting is set out by the control flow shown in FIG. 10, which is executed repeatedly.

In this control, at first, a determination is made at step S70 whether the cooperative motor control is being executed or not, i.e., whether a flag with a motor-cooperation indication is up or not. If the cooperative motor control is being executed, then the control flow proceeds to step S71, where the rotational speed Ne(o) of the engine after the shift to the on-coming speed ratio is calculated by multiplying the real rotational speed output from the transmission (or the vehicle speed) by the gear ratio after the shifting. Then, a rotational speed difference ΔN (=Ne(o)−Ne(a)) is calculated between the rotational speed Ne(o) of the engine after the shifting and the real rotational speed Ne(a) of the engine at step S72, and the rotational speed difference ΔN is processed for a PI (proportional integral) with respect to time t to calculate a target torque increment ΔTQ at step S73, and the target torque increment ΔTQ is added to the current target cooperative torque TQco to calculate a new target cooperative torque TQco at step S74. The target torque increment ΔTQ is calculated by applying a coefficient that corresponds to the speed change ratio to be achieved, so a feedback gain is set in correspondence to the speed change ratio in the control for bringing the torque output from the motor generator 4 to the target cooperative torque TQco.

At step S75, a determination is made whether or not the target cooperative torque TQco, which is calculated as described above, is equal to or smaller than the engine friction torque TQEF. If TQco≦TQEF, then the target cooperative torque TQco calculated at step S74 is maintained, and the control flow proceeds to step S77. If TQco>TQEF, then the control flow proceeds to step S76, where the engine friction torque TQEF is set as the target cooperative torque TQco, and the control flow proceeds to step S77. At step S77, a flag with a cooperative motor torque instruction is set up, and this turn of the control flow ends.

On the other hand, if the result of the determination at step S70 is that there is no cooperative motor control (i.e., a flag with no motor-cooperation indication is up), then the control flow proceeds to step S78, where a determination is made whether a flag with a cooperative motor torque instruction is up or not. A flag with this instruction is up only immediately after the completion of the cooperative motor control. If this is the case, then the control flow proceeds to step S79, where the driving torque of the motor generator 4 is calculated for bringing the cooperative motor torque TQco of the motor generator 4 gradually to the target torque TQo. This calculation is continued until Tqo≧TQco is satisfied at step S80. If TQo≧TQco, then the control flow proceeds to step S81, where a flag with no cooperative motor torque instruction is set up.

However, if the result of the determination at step S78 is that a flag with a cooperative motor torque instruction is not up, i.e., a flag with no cooperative motor torque instruction is up, then the control flow proceeds to step S81, where the flag with no cooperative motor torque instruction is maintained.

Example

Now, a specific example of control is described in reference to FIG. 11, which is a time chart showing chronological changes in various parameters. In this example, a shifting control (a downshift from the fourth speed ratio to the third speed ratio is controlled as an example) is executed while the vehicle is decelerating under a fuel supply cutoff control (idling-elimination control) and a cylinder-off control of the engine after the accelerator pedal is released from its stepped down condition by the driver. The above mentioned various parameters are the rotational speed of the engine Ne, the lock-up clutch control pressure PLC, the clutch pressure Pc, the gear ratio GR indicating the progress of the shifting, and the transmission torque TQ converted as the value on the output shaft of the motor generator 4.

While the vehicle is decelerating at the fourth speed ratio, if the control unit 15 judges that predetermined conditions are satisfied by the decrease of the vehicle speed, then the control unit gives a downshift instruction to the hydraulic control valve 12, starting a control for shifting the transmission to the third speed ratio. In this example, the shifting control starts at time t0; the fourth speed clutch pressure PC(OFF) that establishes the fourth speed ratio, which is an off-going ratio, starts falling at time t0 as indicated by a real line; and the third speed clutch pressure PC(ON) that establishes the third speed ratio, which is an on-coming ratio, rises as indicated by a broken line in (E).

Although the fourth speed clutch pressure PC(OFF), which is the clutch pressure of the off-going ratio, falls, it has reached a first judgment hydraulic pressure P1 at time t1 in this example. Also, the gear ratio at time t1 is GR=4. Namely, it has reached neither the first judgment gear ratio G1 (for example, G1=3.9) nor the second judgment gear ratio G2 (for example, G2=3.7). Therefore, the control flow proceeds from step S55 through step S59 to step S61 during the period from time t0 to time t1, and the motor is not controlled in cooperative operation.

When the fourth speed clutch pressure PC(OFF) decreases and reaches the first judgment hydraulic pressure P1 at time t1, the control flow proceeds from step S55 to step S56. However, the gear ratio GR has not reached the second judgment gear ratio G2, so the control flow proceeds from step S57 to step S58. As a result, the cooperative operation of the motor is initiated and executed in accordance with the control flow shown in FIG. 10. The transmission torque TQ of the transmission, whose value is converted as the value on the output shaft of the motor generator 4, is controlled to the target cooperative torque TQco at time t1 and thereafter, which differs from the target torque TQo set for the deceleration without a shifting as shown in (G).

FIG. 11(G) shows chronological changes in the transmission torque TQ of the transmission. During the deceleration of the vehicle, the target torque TQo is set to provide a desired braking torque (i.e., a torque that generates a so-called engine brake action), and it is determined on the basis of the driving condition (for example, the accelerator opening, the vehicle speed, the rotational speed of the engine, the speed change ratio and the braking action). During the deceleration, the engine 2 is operated under an idling-elimination control and a cylinder-off control, so the engine friction torque (i.e., the torque required from the wheels to drive the engine) is maintained comparatively small to operate the motor generator 4 for energy regeneration. Therefore, the target torque TQo corresponds with the total value of the engine friction torque TQEF and the regeneration torque TQMJ of the motor generator.

After the start of the cooperative operation of the motor at time t1 as mentioned above, the target cooperative torque TQco falls (the braking torque becomes smaller and smaller) as shown in (G). However, at time A, when the target cooperative torque TQco has come above the engine friction torque TQEF, the control flow proceeds from step S75 to step S76 in FIG. 10, where the engine friction torque TQEF is set as the target cooperative torque TQco. As a result, the target cooperative torque TQco never becomes smaller than the engine friction torque TQEF. This prevents accidental transmission of an accelerating torque from the motor generator 4 to the output side during the downshifting from the fourth speed ratio to the third speed ratio, so the downshifting operation is controlled smoothly without any sense of incongruity while the motor generator 4 is being operated for energy regeneration.

On the other hand, as the fourth speed clutch pressure PC(OFF) falls as indicated by the real line, and the third speed clutch pressure PC(ON) rises as indicated by the broken line as mentioned above, the disengaging and the engaging of the clutches progress. At time t2, the gear ratio begins to shift from GR=4 to GR=3 as shown in (F), and the real engine rotational speed Ne(a) begins to increase toward the rotational speed Ne(o) of the engine achieved after the shifting to the on-coming speed ratio (i.e., the rotational speed of the engine that will be achieved after the shift to the third speed ratio) as shown in (C).

When the gear ratio GR reaches the second judgment gear ratio G2 at time t3, the control flow proceeds from step S56 to step S60, where it waits for the elapse of the time set on the delay timer Δt. After the time is up, the cooperative operation of the motor is terminated. Thereafter, the current target cooperative torque TQco is changed gradually to the target torque TQo at step S79, and after it reaches the target torque TQo, the motor generator 4 is operated in correspondence to the target torque TQo.

For the downshifting, when the gear ratio reaches GR=3 at time t4, the fourth speed clutch pressure PC(OFF) is decreased quickly, and the third speed clutch pressure PC(ON) is increased quickly. At time t5, the fourth speed clutch pressure PC(OFF) falls to a predetermined low pressure that brings the fourth speed clutch into complete disengagement, and the third speed clutch pressure PC(ON) rises to a predetermined high pressure that brings the third speed clutch into complete engagement, completing the downshifting. While the downshifting is going on, during a period from time t0 to time t5, the lock-up clutch control pressure PLC(D) is raised to a predetermined high pressure for preventing the lock-up clutch 5 from slipping.

In the example shown in FIG. 11, after the shifting control is initiated at time t0, at first, the fourth speed clutch control pressure PC(OFF) falls to the first judgment hydraulic pressure P1, and then the gear ratio GR reaches the first judgment gear ratio G1. However, if the gear ratio GR reaches the first judgment gear ratio G1 before the falling of the fourth speed clutch control pressure PC(OFF) to the first judgment hydraulic pressure P1, then the cooperative motor control is initiated immediately at the moment when the gear ratio has reached the first judgment gear ratio.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

RELATED APPLICATIONS

This application claims the priority of Japanese Patent Applications No. 2004-340533 filed on Nov. 25, 2004 and No. 2004-340534 filed on Nov. 25, 2004, which are incorporated herein by reference.

What is claimed is:

1. A control system for a hybrid vehicle that comprises an engine, a motor generator and an automatic transmission and that is driven by a driving force being transmitted from at least one of said engine and said motor generator through said automatic transmission to wheels;

said control system comprising:

a shift controller, which executes an automatic shift control on said automatic transmission in response to a driving condition; and a motor controller, which controls operation of said motor generator;

wherein:

while said hybrid vehicle is moving along with an accelerator pedal being released from a stepped down condition, if an automatic shifting is executed by said shift controller;

then said motor generator is operated in cooperation by said motor controller for bringing an input-side rotational speed of said automatic transmission at a start of the shifting closer to the input-side rotational speed that corresponds to a gear ratio achieved after the shifting, such that in said cooperative operation, a target torque increment $\Delta TQ$ is calculated based on a pre- and post-shifting engine rotational speed difference $\Delta N$, and then a target cooperative torque TQco is calculated from the target torque increment, and then the target cooperative torque TQco is compared with an engine friction torque TQEF, and if the target cooperative torque is equal to or smaller than the engine friction torque TQco$\leqq$TQEF, then the target cooperative torque TQco is maintained, but if the target cooperative torque is larger than the engine friction torque TQco>TQEF, then the engine friction torque TQEF is set as the target cooperative torque TQco to bring an output torque of the motor generator to this target cooperative torque TQco; and said cooperative operation of said motor generator is executed to bring a total braking torque against said wheels to a value larger than a braking torque of said engine.

2. The control system as set forth in claim 1, wherein:

a timing for starting said cooperative operation is set on a basis of a shift control command value issued by said shift controller and of a progress of the shifting.

3. The control system as set forth in claim 2, wherein:

said cooperative operation ends when the progress of the shifting reaches a predetermined value.

4. The control system as set forth in claim 2, wherein:

said cooperative operation ends after it has been executed for a time period that is predetermined correspondingly to a type of the shifting.

5. The control system as set forth in claim 1, wherein:

said cooperative operation is executed in feedback control on a basis of a feedback gain that is set in correspondence to a speed change ratio set by said automatic shift control.

6. The control system as set forth in claim 1, wherein:

while said hybrid vehicle is moving along with said accelerator pedal being released from a stepped down condition, if said cooperative operation is to be terminated, then the driving torque of said motor generator is controlled to come gradually to a target torque value.

7. The control system as set forth in claim 1, wherein:

while said hybrid vehicle is moving along with said accelerator pedal being released from a stepped down condition and with said cooperative operation of said motor generator being executed, if said accelerator pedal is stepped down, then said cooperative operation is terminated, and the driving torque of said motor generator and said engine is controlled to come to a target torque value.

* * * * *